May 3, 1932.　　　B. J. LINDGREN　　　1,856,345
BRAKE
Filed Aug. 14, 1930　　　3 Sheets-Sheet 1
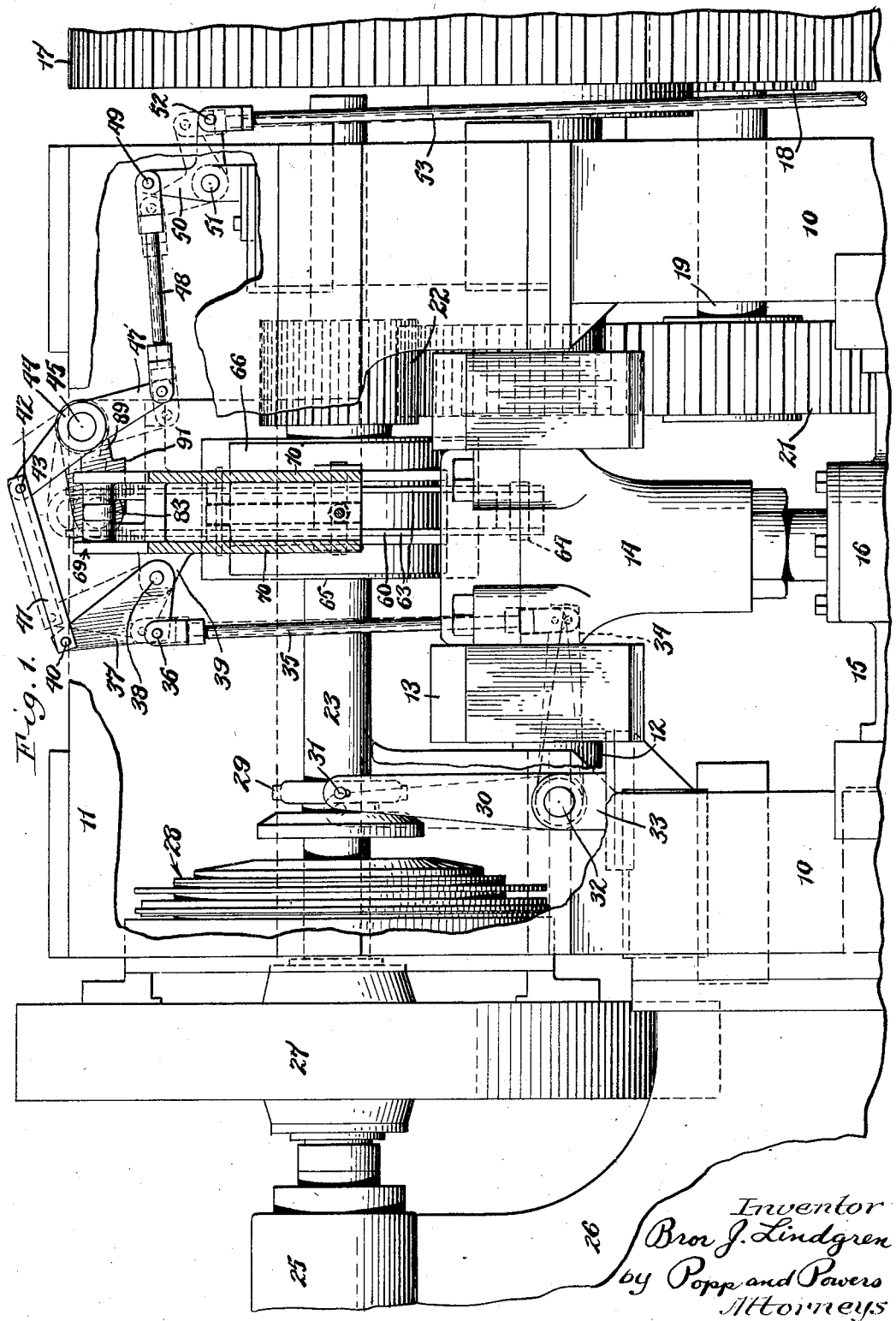

May 3, 1932.  B. J. LINDGREN  1,856,345
BRAKE
Filed Aug. 14, 1930   3 Sheets-Sheet 2
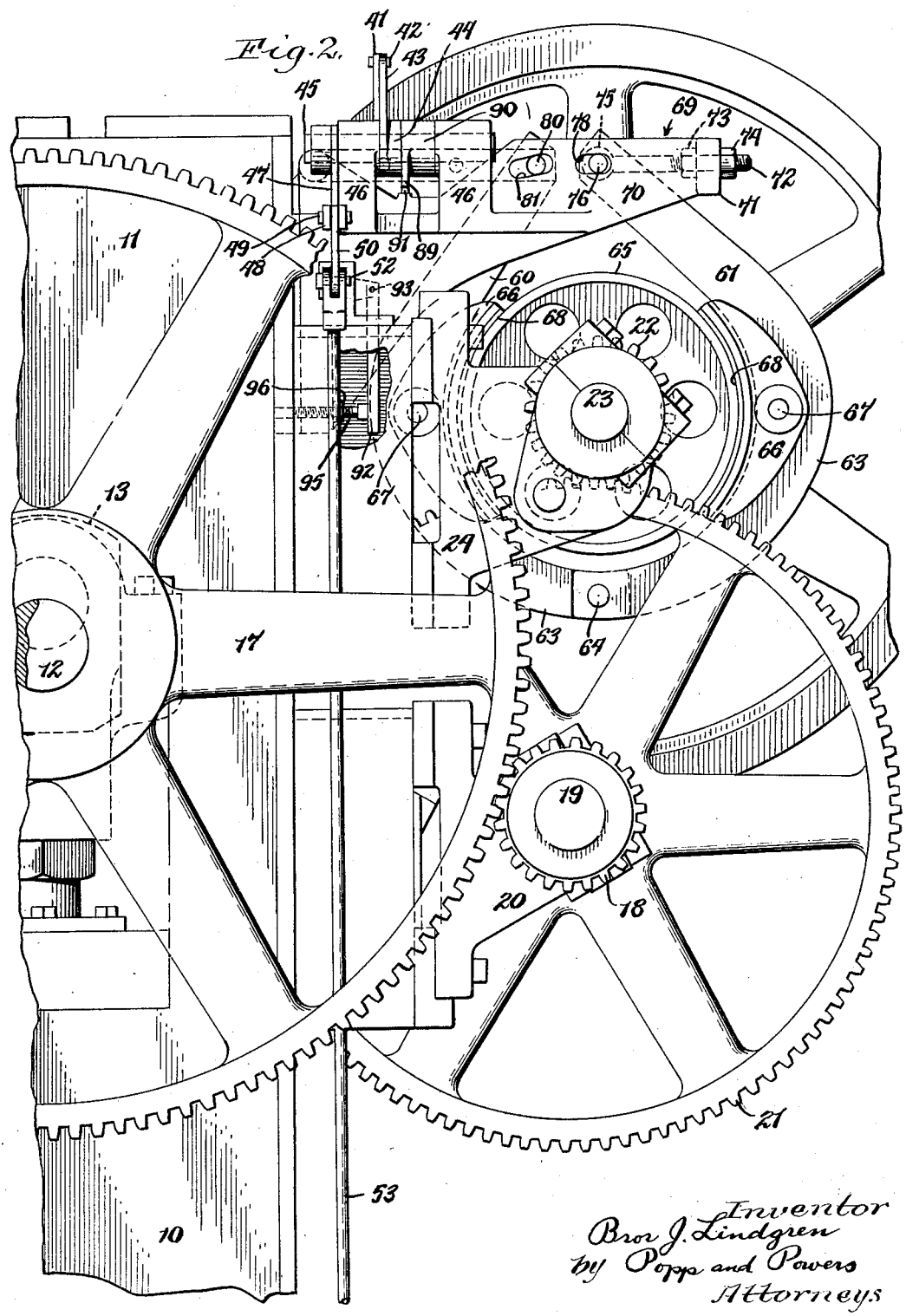

May 3, 1932. B. J. LINDGREN 1,856,345
BRAKE
Filed Aug. 14, 1930 3 Sheets-Sheet 3
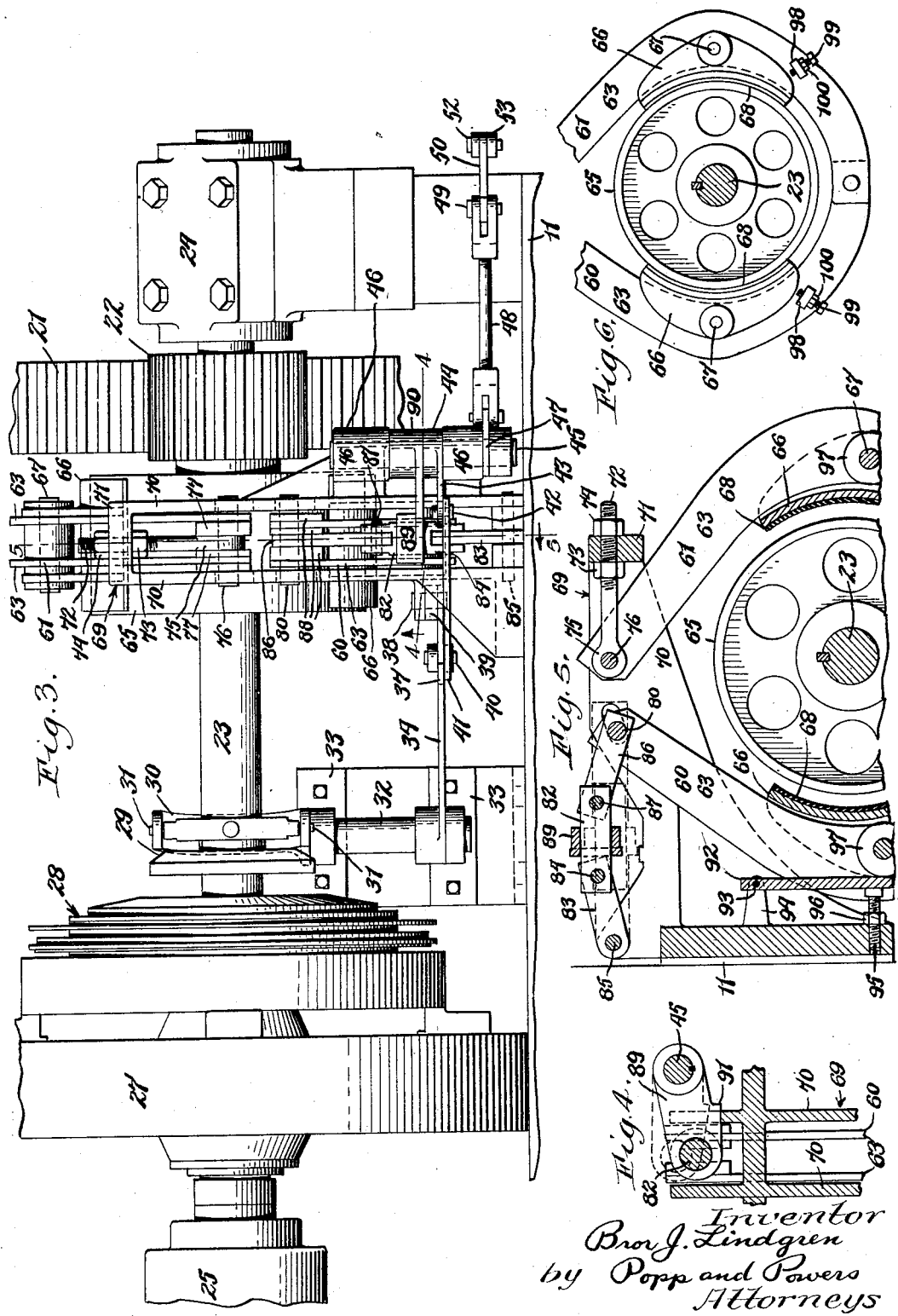

Patented May 3, 1932

1,856,345

UNITED STATES PATENT OFFICE

BROR J. LINDGREN, OF BUFFALO, NEW YORK, ASSIGNOR TO NIAGARA MACHINE AND TOOL WORKS, OF BUFFALO, NEW YORK, A CORPORATION OF NEW YORK

BRAKE

Application filed August 14, 1930. Serial No. 475,159.

This invention relates to a brake and is shown as embodied in a combined brake and clutch for a punch press which are simultaneously operated so that when the power clutch is opened to disconnect the punch press mechanism from the source of power the brake is immediately applied to the main drive shaft of the punch press so that the punch press mechanism is instantaneously stopped.

One of the principal objects of this invention is to provide a brake including a pair of pivoted arms which are arranged to embrace the brake drum and which upon having their opposite ends contracted are drawn toward the brake drum, these brake arms being free or floating at their inter-pivoted ends. By providing such floating brake arms a very powerful gripping effect is obtained and the brake arms are entirely self-aligning so that uniform pressure is applied to opposite sides of the brake drum and the maximum braking efficiency is obtained.

A further purpose is to provide readily adjusted means by which the degree of the floating brake arms can be adjustably limited. This adjustment means prevents all danger of the brake shoes dragging when the brake is released and also insures smooth action of the brake when it is applied.

Another object is to provide such a brake which, due to the floating form of the brake arms and also due to a toggled operating mechanism obtains the maximum braking effect with the smallest application of power upon the same.

A still further object is to provide means which are simple and readily adjusted for varying the degree of braking effect obtained upon application of the brake mechanism to the brake drum.

Other objects are to provide such a brake mechanism which is simple and inexpensive in construction, is reliable in its operation and will not get out of order or adjustment under severe or constant use.

In the accompanying drawings:—

Figure 1 is a fragmentary front elevation of a punch press having a brake embodying my invention and showing it connected with a disk clutch.

Figure 2 is a fragmentary end elevation of the punch press showing parts thereof broken away to disclose the braking mechanism.

Figure 3 is a fragmentary top plan view of the punch press shown in Figs. 1 and 2.

Figure 4 is a fragmentary vertical section taken on line 4—4, Fig. 3.

Figure 5 is a fragmentary vertical section taken on line 5—5, Fig. 3.

Figure 6 is a view similar to Fig. 5 showing a modified form of the invention in which means are provided for limiting the movement of the brake shoes upon brake arms.

In its general organization this invention comprises a pair of arcuate brake arms which are adapted to embrace a brake drum, and the lower ends of which are pivoted together and are entirely free or floating, a brake shoe pivoted to the middle of each of said brake arms and adapted to engage the brake drum, adjustable means for pivotally holding the upper end of one of said brake arms in a relatively fixed position, a toggle means for moving the upper end of the other brake arm toward and from the fixed end of the last named brake arm to apply and release the brake, means associated with the clutch operating mechanism for extending and shortening the toggle mechanism, and adjustable means carried by the machine frame for limiting the outward movement of the brake arm connected to the toggle mechanism so that in the released condition of the brake the brake arms are held so that there is no danger of the brake shoes dragging on the brake drum.

The brake embodying the present invention is shown as applied to a punch press, the form of punch press shown being described in greater detail in my co-pending application Serial No. 440,075, filed March 29, 1930. As shown this punch press is supported by a frame composed of structural or rolled steel shapes welded together and includes a pair of standards or legs 10 the lower ends of which are carried by a base (not shown) and the upper ends of which are connected by a cross head 11. Suitably journaled at the upper end of the standards 10 is a main drive shaft 12 having a large crank 13 formed at its center between the standards 10. This crank 13 carries a pitman or connecting rod 14 which is connected to a vertically reciprocable cross head 15 by a universal joint 16. The vertically moving cross head 15 is guided in any suitable manner by the standards 10 and is adapted to carry the male die (not shown) which connects with a female die (not shown) carried on the table formed by the base or pedestal (not shown).

The main shaft 12 is turned to reciprocate the movable cross head 16 and its male die by means of a train of gears including a large gear 17 fast to the main drive shaft 12 at one side of the machine frame and meshing with a pinion 18 which pinion is fixed to a countershaft 19. This countershaft is carried by suitable bearings 20 secured to the standards 10 and between these bearings the countershaft carries a large gear wheel 21 which meshes with a pinion 22 carried by a power shaft 23. This power shaft 23 is journaled at one end in a bearing 24 which is secured to the upper cross head or beam 11 of the machine frame and at its opposite end is journaled in a bearing 25 at the end of an arm 26 which is secured to the side of one of the standards 10, as best shown in Fig. 1. The power pulley 27 is easily mounted on the power shaft 23 and transmits power through a disk clutch 28, which clutch 28 can be of any usual and well known construction. As shown the operating sleeve 29 of this clutch is slid longitudinally of the power shaft 23 by means of a fork 30 the ends of which are slotted to receive a pair of oppositely located pins 30 on the clutch sleeve 29. The lower end of the clutch fork 30 is fixed to a shaft 32 carried by bearings 33 secured to the corresponding standard 10. This shaft 32 also carries a lever 34 which extends inwardly and at its outer end is pivotally connected to an adjustable upwardly extending shipper rod 35. The upper end of the shipper rod 35 is forked and is pivoted at 36 to a bell crank lever 37. This bell crank lever 37 is carried by a pivot pin 38 secured to an ear 39 of the upper cross head 11 of the machine frame and is also pivoted at 40 to a link 41. The opposite end of this link is pivotally connected at 42 to a lever 43 which projects outwardly from an integrally formed hub 44, this hub being rigidly connected with a shaft 45 in any suitable manner. This shaft is carried by suitable bearings 46 which project outwardly from the upper cross head 11 of the machine frame. At the front end of the shaft 45 a lever 47 is fixed thereto, this lever projecting downwardly and at its lower end being pivotally connected to a horizontal adjustable rod 48.

The other end of this rod 48 is pivotally connected as at 49 to a bell crank lever 50, the medial part of which is pivotally mounted by means of a pin 51 to the machine frame and the other arm of which is pivotally connected as at 52 to an adjustable shipper or treadle rod 53. This treadle rod 53 extends downwardly to the base of the machine and is connected with a treadle or hand lever (not shown) preferably in such manner that when the treadle or hand lever is operated the main shipper rod 53 is depressed to open the clutch 28 and apply the brake, as hereinafter described, this position of the parts being shown by full lines in Fig. 1. Each of the shipper rods 35, 48 and 53 is of such form that it is adjustable as to length thereby permitting of adjusting the operative movement of these parts and taking up wear upon the clutch and upon the brake.

The brake includes two arcuate arms 60 and 61 each of which is composed of two plates 63 which are spaced apart. These arcuate arms 60 and 61 are pivotally secured together at their lower ends by a pivot pin 64 and these arms embrace a brake drum 65 fast on the drive shaft 23. Each of the arcuate brake arms 60 and 61 has pivotally secured thereto a brake shoe 66, this brake shoe being of arcuate form to fit the brake drum 65 and being of channel form in cross section so that its sides are arranged outside of the plates 63 forming the brake arms. The pivotal mounting of the brake shoes 66 comprises pivot pins 67 passing through the sides of the brake shoes and through the plates 63 of the corresponding brake arms 60 and 61. The arcuate face of each of the brake shoes 66 is provided with a brake lining 68 which can be of any suitable material.

Projecting rearwardly from the upper cross head 11 of the machine frame is a bracket 69 which is U-shaped in plan having sections 70 and an outer end cross part 71. In this outer end 71 of the bracket 69 an adjusting screw 82 is adjustably secured for longitudinal movement by means of two nuts 73 and 74 which bear against the outer and inner sides of the end 71 of the bracket 69. The inner end of this adjusting screw 72 is formed to provide an eye 75 which receives a pivot pin 76. This pin 76 passes through spacing washers 77, through the upper ends of the plates 63 forming the arm 61 and through slots 78 provided in the sides 70 of the bracket 69. It is therefore apparent that the upper end of the brake arm 61 is pivoted to the stationary pivot 76 but that this pivot 76 is adjustably movable fore and aft by moving the adjusting screw 72 in a corresponding direction. The degree to which this adjustment may be effected is limited by the length of the slots 78 in the bracket 69, in which slots the pivot pin 76 rides. This adjustment of the arm 61 is necessary to compensate for wear of the lining 68 of the bracket shoe 66 carried by the arm 61, or when the brake is relined.

The engagement of the braking shoes 66 with the brake drum 65 is effected by the movement of the upper end of the brake arm 60 toward the relatively fixed end of the brake arm 61, this movement bringing the two brake arms 60 and 61 together and forcing the lined faces of the brake shoes 66 into engagement with the brake drum. For this purpose the upper end of the brake arm 60 carries a pivot pin 80 which rides in a pair of inclined slots 81 provided in the sections 70 of the bracket 69, these slots 81 inclining upwardly and rearwardly. Upon applying a rearward pressure to the pin 80 it is apparent that the brake arm 60 is moved rearwardly and slightly upwardly so that a smooth non-chattering grip is obtained upon the brake drum 65. This movement is effected by a toggle joint composed of a central cylindrical member 82 the opposite ends of which are bifurcated as best shown in Fig. 3. The front end of this cylindrical toggle member 82 is connected to a flat vertically swinging link 83 by means of a pivot pin 84 which passes through the bifurcated front end of the cylindrical member 82 and through the link 83, the link 83 being disposed between the bifurcations at the front end of the cylindrical toggle member 82. The other end of the link 83 is pivotally secured to the bracket 69 by means of a pivot pin 85. Arranged between the bifurcations at the rear end of this cylindrical toggle member 82 is another flat link 86 which is connected to the cylindrical toggle member 82 by a pivot pin 87. The other end of this link 86 is pivotally connected to the pivot pin 80 which carries the brake arm 60. Suitable spacing washers 88 are preferably provided between the link 86, the side plates 63 forming the front arcuate brake arm 60 and between the brake arm 60 and the bracket 69. For the purpose of raising and lowering the cylindrical central toggle member 82 and thereby expanding and contracting the bracket arms 60 and 61 about the brake drum the central toggle member 82 is rotatably mounted in the outer end of an arm 89, this arm having an integrally formed hub 90 which is fast to the shaft 45. To limit the downward movement of the arm 89 and thereby limit the downward movement of the cylindrical toggle member 82 and the contracting movement of the brake arms 60 and 61, the lower side of the lever 89 is formed to provide a stop 91 which engages the corresponding side 70 of the bracket 69, as best shown in Fig. 4. This prevents any undue pressure being applied to the brake in stopping the punch press and since the shaft 45 also forms part of the clutch operating mechanism it also limits the opening movement of the clutch. With this organization it is apparent that the turning of the shaft 45, which forms part of the clutch operating mechanism, raises and lowers the central toggle member 82 and causes the toggle joint to contract and expand and thereby expand and contract the bracket arms 60 and 61 about the brake drum 65.

With this arrangement it is apparent that the brake arms 60 and 61 are floating, the only connections for these arms being at their upper ends so that their lower inter-pivoted ends are free to float and adapt themselves to the brake drum. This provides for self-alinement of the brake to the brake drum and in combination with the toggle joint at the upper end of these floating arms secures a very powerful braking effect from a relatively slight application of power. Without the provision of means to prevent it, however, there would be a tendency for the brake shoe 66 mounted on the brake arm 61 to drag upon the brake drum 65 when the brake is in the released position shown in Fig. 5, the separation of the brake shoes from the brake drum being somewhat exaggerated in this view. To prevent such dragging an adjustable stop is provided for the opposite brake arm 60 of the bracket. This stop arm 92 is secured at its upper end by means of a pivot 93 to a pair of arms 94 projecting outwardly from the machine frame. At its lower end this arm bears against the end of a stop screw 95 which is held in any adjusted longitudinal position by a lock nut 96 and limits the forward movement of the lower end of the stop arm 92. This stop arm 92 is so arranged that its lower end is in the path of a spacer 97 which surrounds each of the pivot pins 76 carrying the brake shoes 66. With this arrangement when the brake is released and the brake arms 60 and 61 are separated the spacer 97 on the brake arm 60 contacts with the stop arm 92 and prevents the two brake arms 60 and 61 from swinging forwardly far enough to permit the brake shoe 66 on the opposite brake arm 61 to engage and drag upon the brake drum 65 when the brake is released.

In Fig. 6 is illustrated a means for limiting the swinging movement of the brake shoes 66 relative to their supporting brake arms 60 and 61 and thereby prevent the brake shoes from swinging far enough to drag upon the brake drum 65 when the brake is released. As there shown each brake arm 60 and 61 is provided at one side with an ear 98 carrying an adjusting screw 99 which is locked in position by a lock nut 100. The end of the adjusting or stop screw 99 is arranged in the position of a lower end of each of the brake shoes 66 and thereby preventing the lower ends of these brake shoes from swinging outwardly far enough to permit their upper ends to engage and drag upon the brake drum.

Operation

Assuming that the punch press is operating and that the operator wishes to stop the same, he moves or releases the treadle or hand lever (not shown) so as to depress the shipper rod 53. This movement rotates the fixed bell crank lever 50 to draw the shipper rod 48 horizontally outward and thereby move the lever 47 outwardly to the full line position shown in Fig. 1. This rotates the shaft 45 counter-clockwise, as shown in Fig. 1, and forces the lever 89 downwardly until its stop 91 engages the bracket 69, as shown by full lines in Fig. 4. This forces the central cylindrical toggle member 82 downwardly and expands the toggle joint composed of the links 83, 82 and 86 and thereby causes the pivot pin 80 to ride up the slot 81 and move the bracket arm 60 toward the brake arm 61. The upper end of the brake arm 61 is held by the adjustable fixed pivot 76 and the lower ends of these brake arms are floating and pivotally connected so that this expanding movement of the toggle joint, as best shown in Fig. 5, causes the brake arms 60 and 61 to contract about the brake drum 61 and the pivoted brake shoes 66 on these brake arms to engage the brake drum 65 and stop the movement of the main drive shaft 23. The adjustment of the braking effect of the brake arms 60 and 61 is obtained through the adjusting screw 72 which determines the position of the upper pivoted end of the brake arm 61, this pivot, in any adjusted position, being stationary.

The movement of the shaft 45 in applying the brake, also causes the clutch lever 43 fixed thereto to swing to the left, as viewed in Fig. 1 and move the link 41 and bell crank lever 37 outwardly relative to the center of the machine. This movement of the bell crank lever depresses the shipper rod 35 and arm or lever 34 thereby rotating the shaft 32 clockwise, as viewed in Fig. 1, and moving the upper end of the clutch fork 30 inwardly. This movement moves the clutch sleeve 29 inwardly and effects an opening or release of the disk clutch 28. It is therefore apparent that the brake and clutch are substantially simultaneously operated.

When the operator wishes to again start the punch press in operation he moves the hand lever or treadle (not shown) to elevate the shipper rod 53 thereby moving the bell crank lever 50 to swing the shipper rod 48 and lever 47 inwardly and rotating the shaft 45 clockwise as viewed in Fig. 1. This rotation of the shaft 45 causes the lever 89 to raise, as best shown in Fig. 4, and elevate the central cylindrical toggle member 82. This elevation of this toggle member, as best shown in Fig. 5, contracts the toggle joint composed of the links 83, 82 and 86 and thereby moves the upper end of the bracket arm 60 away from the upper end of the brake arm 61, thereby expanding these brake arms and releasing the brake shoes 66 from the brake drum 65. This movement continues until the spacer 97 on the brake arm 60, as shown in Fig. 5, engages the adjustable stop arm 92, which insures that the opposite brake shoe 66 moves free of the brake drum 65, the brake arms being pivotally connected and floating at their lower ends.

This movement of the shaft 45 also causes the disk clutch 28 to close, the movement of the shaft 45 clockwise, as shown in Fig. 1, raising the lever 43, moving the link 41 and bell crank lever 37 outwardly and inwardly, raising the shipper rod 35, raising the arm 34 and causing the clutch fork 30 to swing outwardly and force the clutch sleeve 29 outwardly to close the clutch 28 and effect a driving connection between the pulley 27 and the drive shaft 23.

From the foregoing it is apparent that the present invention provides a brake which by reason of the floating construction of the brake arms which embrace the brake drum render the brake elements self-alining and in combination with the toggle joint for moving the same provides a brake in which a powerful braking effect is secured upon the application of relatively slight power. The brake is also so designed that it functions smoothly and releases easily and also will not drag upon the brake drum when it is in its inoperative position. The brake is also simply and easily adjusted, it is composed of few parts which are simple and inexpensive to manufacture and assemble and will give satisfactory service under severe and constant use without getting out of order or adjustment.

I claim as my invention:

1. In combination with a brake drum and a support, a pair of arcuate floating brake arms pivoted together at their lower ends and adapted to embrace said brake drum, brake shoes carried by said arms, means for pivotally supporting one of said brake arms from said support, comprising a horizontal bolt extending through said support in line with said brake arms and movable longitudinally therein, said bolt having an eye and a pivot pin extending through said eye and brake arm and also slidingly supported in a slot in said support, and means for moving the other brake arm toward and from said first arm to apply and release said brake shoes.

2. In combination with a brake drum, a pair of floating brake arms pivoted together at their lower ends and adapted to embrace said drum, brake shoes carried by said arms, means for supporting and moving the upper end of one of said arms toward and from the other to apply and release said brake shoes and stationary stop means for limiting the joint swinging movement of one of said arms relative to said drum to prevent accidental engagement of either of said shoes with said drum.

3. In combination with a brake drum, a pair of floating brake arms pivoted together at their lower ends and adapted to embrace said drum, brake shoes carried by said arms, means for pivotally supporting the upper end of one of said brake arms, means for adjustably limiting the swinging movement of the other brake arm in a direction opposite to said first brake arm to prevent dragging of the shoe on said first brake arm when the brake is released and means for moving the upper end of said other brake arm toward and from said first brake arm to apply and release said brake shoes.

4. In combination with a brake drum, a pair of floating brake arms pivoted together at their lower ends and adapted to embrace said drum, brake shoes carried by said arms, means for pivotally supporting one of said arms, an adjustable stop adapted to engage the outer side of the unpivoted brake arm and limit the swinging movement of said brake arms to prevent dragging of the brake shoe on said pivoted brake arm when the brake is released and means for moving the upper end of the unpivoted brake arm toward and from the other brake arm to apply and release said brake shoes.

5. In combination with a brake drum, a pair of floating brake arms pivoted together at their lower ends and adapted to embrace said drum, brake shoes carried by said arms, means for pivotally supporting one of said arms, an adjustable stop adapted to engage the outer side of the unpivoted brake arm and limit the swinging movement of said brake arms to prevent dragging of the brake shoe on said pivoted brake arm when the brake is released and means for moving the upper end of the unpivoted brake arm toward and from the other brake arm to apply and release said brake shoes, said adjustable stop comprising a plate pivoted at one end and arranged in the path of said unpivoted brake arm and an adjustment screw bearing against the opposite side of said plate and supporting it.

6. In combination with a brake drum and a support, a pair of floating brake arms pivoted together at their lower ends and adapted to embrace said drum, brake shoes carried by said arms, means for pivotally supporting one of said brake arms, and means for moving the upper end of the other arm toward and from said first brake arm comprising three toggle links pivotally connecting said other brake arm and said support and extending in the opposite direction from said first brake arm, the middle link of said links being of cylindrical form, a lever carried by said support and adapted to lower and raise said middle toggle link to move said arms toward and from one another, and means for raising and lowering said lever.

7. In combination with a brake drum and a support, a pair of floating brake arms pivoted together at their lower ends and adapted to embrace said drum, brake shoes carried by said arms, means for pivotally supporting one of said brake arms, and means for moving the upper end of the other arm toward and from said first brake arm comprising three toggle links pivotally connecting said other brake arm and said support and extending in the opposite direction from said first brake arm, the middle link of said links being of cylindrical form, a lever carried by said support and adapted to lower and raise said middle toggle link to move said arms toward and from one another, means for raising and lowering said lever, and means for limiting the downward movement of said lever.

8. In combination with a brake drum, a pair of floating brake arms pivoted together at their lower ends and adapted to embrace said drum, brake shoes carried by said brake arms, means for pivotally supporting the upper end of one of said brake arms, means for moving the upper end of the other brake arm toward and from said first brake arm and means for guiding the upper end of said moved brake arm upwardly in its movement toward said first brake arm and downwardly in its return movement.

9. In combination with a brake drum and a support, a pair of floating brake arms pivoted together at their lower ends, and adapted to embrace said drum, brake shoes carried by said brake arms, means for pivotally supporting the upper end of one of said brake arms, means for moving the upper end of the other brake arm toward and from said first brake arm and means for guiding the upper end of said moved brake arm upwardly in its movement toward said first brake arm and downwardly in its return movement comprising a pin carried at the upper end of said moved brake arm and riding in an inclined slot in said support.

In testimony whereof I hereby affix my signature.

BROR J. LINDGREN.